United States Patent

Verch

[11] Patent Number: 6,073,412
[45] Date of Patent: Jun. 13, 2000

[54] CORNER KEY FOR WINDOW COMPONENT ASSEMBLY

[76] Inventor: John T. Verch, 337 Mockingbird La., Coldwater, Mich. 49036

[21] Appl. No.: 09/375,098

[22] Filed: Aug. 16, 1999

Related U.S. Application Data

[62] Division of application No. 09/148,516, Sep. 4, 1998.
[51] Int. Cl.[7] .................................................. E04C 2/30
[52] U.S. Cl. ................. 52/656.5; 52/656.1; 52/656.4; 52/656.9; 52/658; 403/402
[58] Field of Search ................................... 52/658, 656.1, 52/656.7, 656.4, 656.5, 656.9, 655.1; 403/402, 401, 231

[56] References Cited

U.S. PATENT DOCUMENTS

| | | | |
|---|---|---|---|
| 2,661,822 | 12/1953 | Wisok | 403/231 X |
| 2,861,659 | 11/1958 | Hagerty et al. | 403/231 |
| 2,984,447 | 5/1961 | Duvall et al. | 403/231 X |
| 4,453,855 | 6/1984 | Richter et al. | 52/656.5 X |
| 4,570,406 | 2/1986 | DiFazio | 52/656.9 |
| 4,841,696 | 6/1989 | Miller | 52/656.5 X |
| 4,862,612 | 9/1989 | Sugihara et al. | 403/402 X |

Primary Examiner—Carl D. Friedman
Assistant Examiner—Phi Dieu Tran A
Attorney, Agent, or Firm—Lee, Mann, Smith, McWilliams, Sweeney and Ohlson

[57] ABSTRACT

The present invention relates to corner keys used in assembling structural components to form various structural shapes, such as a frame and sash section for a window, door panel, or other building or architectural construction. The structural members are formed by a process that includes continuously roll-forming a first sub-part and a second sub-part from pre-treated metal in flat coil-stock form. A thin layer of Extrudable Thermal plastic (ETP) is then selectively extruded to both the outside and inside surfaces of the sub-parts. Some of the ETP is extruded onto the roll-formed sub-parts in a functional shape, such as a "C" shaped pocket used to clip parts together. The sub-parts are joined together to form structural component material that can then be cut and fabricated to form individual structural components. Once the roll-formed structural components are selectively joined or coupled together to form a frame or sash, a shot of urethane foam is injected into the frame or sash and allowed to expand to fill the interior of the frame or sash. The addition of the foam provides permanent adhesion among the various structural components and significantly improves the structural integrity of the window casement. Hollow corner keys, the subject of the present invention, can be further added to improve the structural integrity of the window casement.

2 Claims, 6 Drawing Sheets

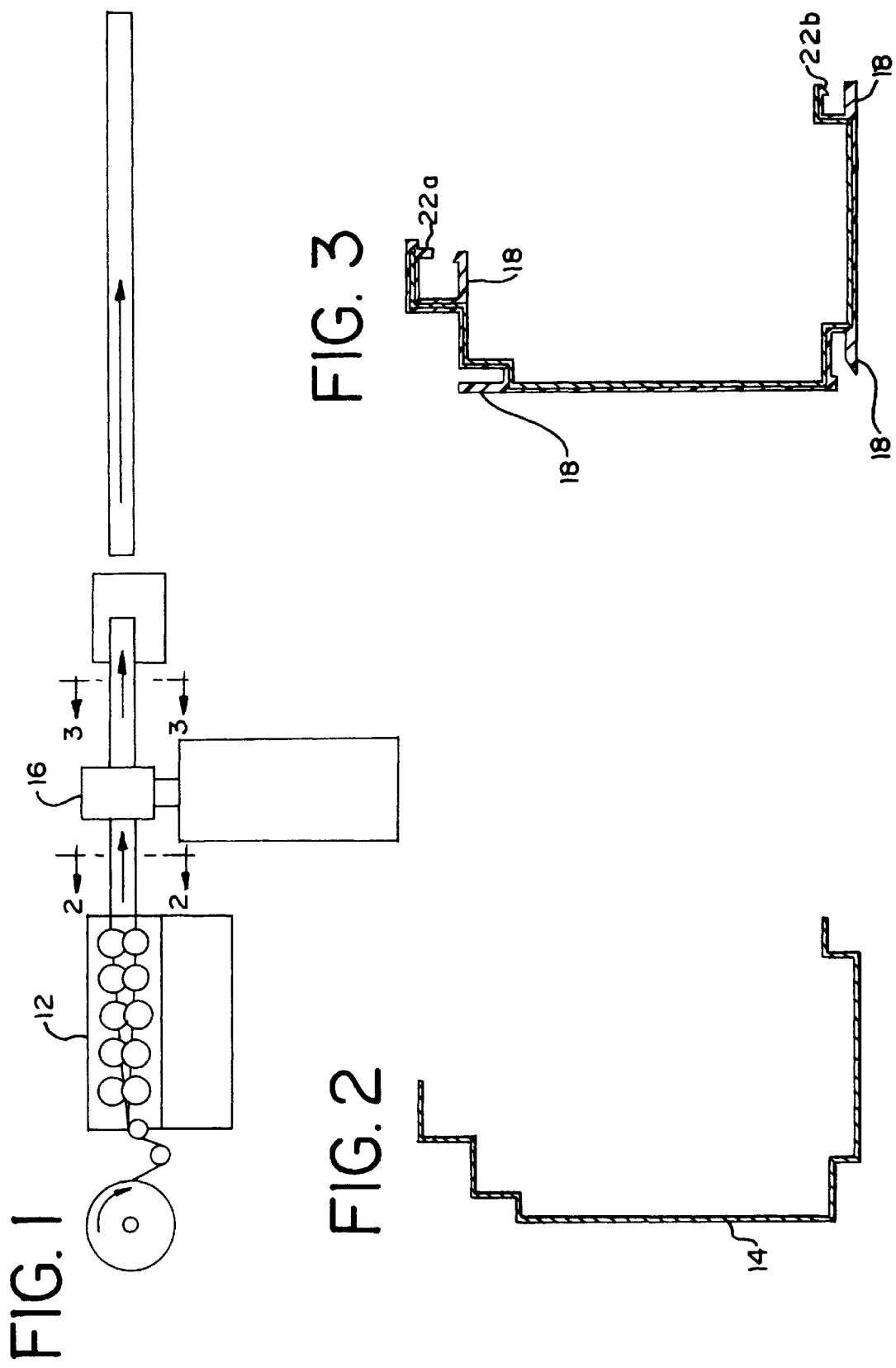

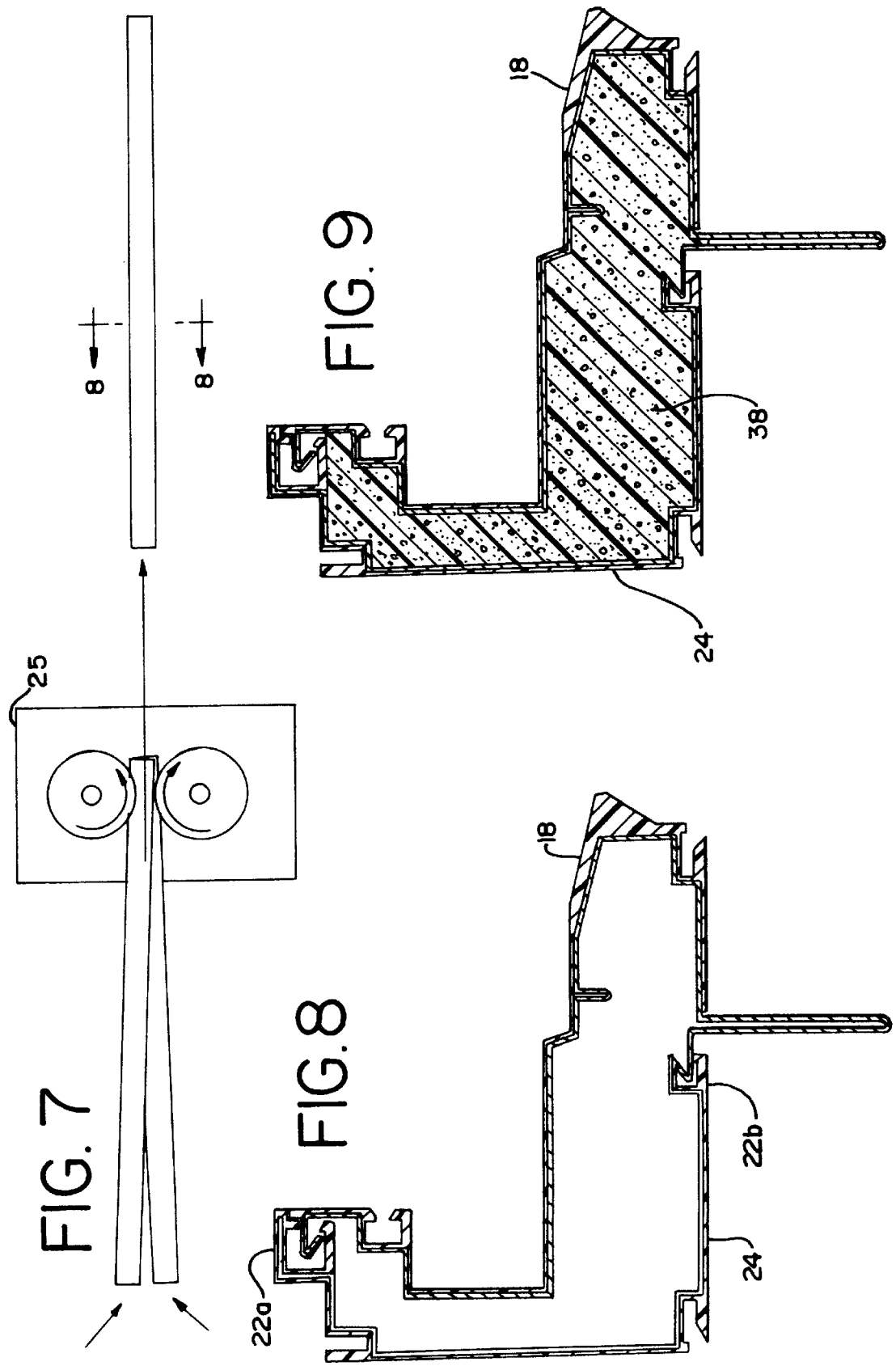

CORNER KEY FOR WINDOW COMPONENT ASSEMBLY

RELATED APPLICATION

This is a divisional application of Application Ser. No. 09/148,516, filed Sep. 4, 1998, now pending.

BACKGROUND OF THE INVENTION

This invention relates broadly to structural components, such as studs used for structural framing of building systems, i.e., beam columns, etc., and particularly to casement sections, or frames and sashes for windows, doors, panels or other building or architectural constructions. For convenience herein, the invention will be defined and described with particular reference to window casements (frames and sashes), but it will be understood that the invention is of general utility.

Existing window casement components used in the construction of window frames and sashes suffer from a number of disadvantages and it is difficult to meet all the practical requirements without excessive weight or cost. For example a window casement must have adequate strength, the corners and other joints must be rigid, the casement members must have longitudinal and torsional rigidity, the members must be durable, resistant to impact and damage, corrosion resistant, leakproof, remain stable at temperatures above 150° F., and also preferably should have thermal insulating properties to prevent excessive conduction of heat from the internal to the external surfaces, or vice-versa.

Traditional timber and extruded aluminum and polyvinyl chloride (PVC) and other composite material members fail to meet a number of these requirements, while conventional solid or hollow extruded aluminum or pultruded glass resin shapes are expensive and also fail to meet many of the requirements. Window casement components have also been constructed in hollow rolled aluminum brass or steel sections, which may be coated to resist corrosion, but in order to provide adequate longitudinal and torsional strength the gauge of the rolled sheet must be quite substantial, which results in a heavy and expensive construction. Moreover, it is difficult to form corner and other joints since steel components coated with material such as synthetic plastics or pultrusions cannot be welded without damaging the coating.

Various other composite constructions have been proposed but all known constructions are either expensive or fail to meet the optimum design requirements.

Prior art conventional PVC frames are a faulty combination of low rigidity with poor material shear strength that requires an aluminum or steel stiffener be placed into one of the internal cavities to enhance its structural properties. The rigidity enhancement necessary is minimized by locating the structural member close to the neutral axis of the PVC shape.

Additional mechanical problems with the conventional PVC design include excessive thermal expansion with temperature fluctuations from winter to summer and extreme temperature gradients from the environmentally controlled inside of the building to the natural environment of the outside of the building, where a typical window will expand and contract ¼ inch in height and width. This places stress on the welded corner joints and nailing fin which has proven to cause fracturing failures in the field. Additionally, the PVC shape is generally restricted to lighter colors such as white and beige, as darker colors can allow the PVC temperatures to rise above the heat deflection temperature of the material, which is approximately 140°–150° F.

SUMMARY OF THE INVENTION

The present invention relates to corner keys used in assembling structural components to form a structural shape, such as a frame and sash section for a window, door panel, or other building or architectural construction. The structural components are formed by a process that includes continuously roll-forming structural components from pre-treated metal in flat coil stock form. A thin layer of Extrudable Thermal Plastic (ETP) is then selectively extruded to both the outside and inside surfaces of the roll-formed component. Some of the ETP is extruded onto the roll-formed component in a functional shape, such as a "C" shaped pocket used to clip parts together.

This process of extruding ETP shapes over roll-form members extends the traditional roll-forming process with the capability of incorporating additional functional shapes into the roll-formed component that either could not be done by roll-forming alone or would be cost prohibitive from a roll-form tooling standpoint. The process has the advantage of being completed four to eight times faster than traditional extruded ETP members. This, combined with utilizing thin roll-formed metal profiles and ETP materials allows this process to produce structural components that are approximately the same manufacturing cost of traditional extruded components, while incorporating superior mechanical properties.

After the roll-formed/extruded components leave the extruder, they are cut into lineals and are ready to be fabricated into frame components used in the window and/or structural shape assembly. With specific reference to window casement frames, the lineals are miter-cut to form frame components which are joined or coupled together by injection-molded corner keys to form a window casement frame. The corner keys are the subject of the present invention. Next, a one to ten pound shot of urethane foam is injected into the window casement frame and allowed to expand to fill the interior of the frame. The hollow corner keys are designed to allow the liquid foam to pass through with minimal restriction. In addition, the keys have holes strategically molded into their outer walls to allow foam to flow around the outside of the corner key, which locks the key to the frame or sash components. A series of recesses, which are integrated into the injection-molded corner key, allow the foam to flow freely between the outside surfaces of the corner key and the inside surfaces of the formed section while preventing the foam from escaping through the miter joints of the window casement frame components to the outside surfaces of the product. A similar method is used to create the window casement sash as well.

The urethane foam fill is injected into the window assembly to serve several functions, including: 1) providing permanent adhesion to the corner key and the roll-formed/extruded composite window components, 2) blocking water seepage into the interior of the window assembly, 3) blocking air flow through any small gaps in the window assembly, and 4) significantly improving the structural integrity of the window casement.

The increased structural integrity and thermal efficiency of the disclosed invention allows for a wide variety of design profiles. The frame components can be made of a full range of colors without risk of thermal instability. In addition, a window frame and sash that is fabricated from the disclosed method can withstand 50 mph wind driven rain without leakage due to reduced deflections caused by increased rigidity, which allows weather seals between the window casement frame and sash components to remain in contact.

BRIEF DESCRIPTION OF THE DRAWINGS

FIG. 1 is a simple diagram of the roll-forming and extrusion process used to create a first sub-part.

FIG. 2 is a cross-sectional view of the first sub-part after it has been roll-formed (shown along lines 2—2 of FIG. 1).

FIG. 3 is a cross-sectional view of the first sub-part of FIG. 2 after a thin layer of ETP has been extruded over it in predetermined functional shapes (shown along lines 3—3 of FIG. 1).

FIG. 7 is a simple diagram of the roller assembly station used to connect the first sub-part and the second sub-part to form a length of structural component material.

FIG. 8 is a cross-sectional view of the resultant length of the component material.

FIG. 9 is a cross-sectional view of a fabricated structural window component of an assembly after urethane foam has been injected within its hollow interior and allowed to expand and cure.

DETAILED DESCRIPTION OF THE PREFERRED EMBODIMENT

The present invention relates to corner keys used in assembling structural components to form a structural shape, such as a frame and sash section for a window, door panel, or other building or architectural construction. The structural shapes are the subject of U.S. Application Ser. No. 09/148,516, incorporated herein by reference. The structural components are formed by a process that includes the use of roll-formers 12 which continuously form a first sub-part 14 from pre-treated metal in flat coil stock form, as shown in FIG. 2. The preferred metal is aluminum in flat coil stock, although it is known that other similar type structural metals could also be used. Directly behind the roll formers 12 are cross-head extruders 16 which extrude a profile of one-hundredth to six-hundredths of an inch layer of a synthetic material 18, preferably an Extrudable Thermal Plastic (ETP), to both the outside and inside surfaces of the first sub-part 14, as can be seen in FIG. 3. An example of an ETP of this nature is GEON, a polyvinyl resin manufactured by the B. F. Goodrich Company.

Figure 4:
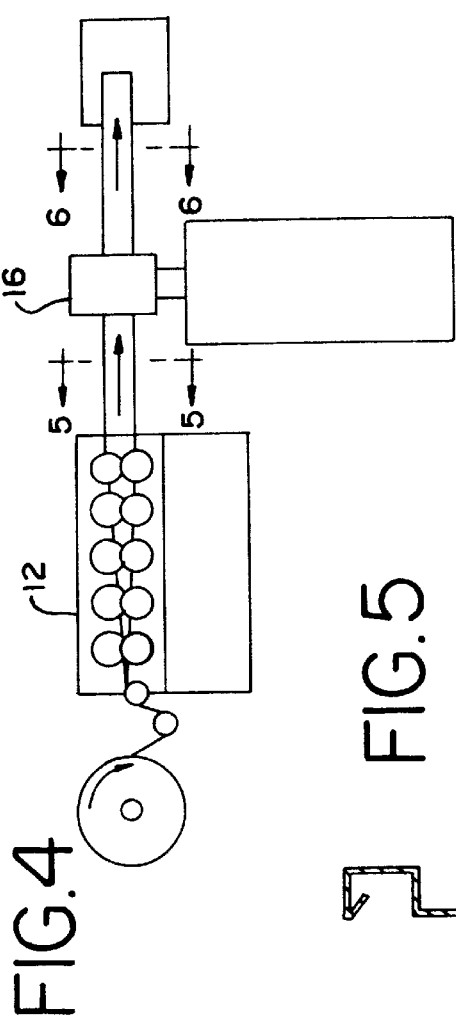
FIG. 4 is a simple diagram of the roll-forming and extrusion process used to create a second sub-part that is a counterpart to the first sub-part.
Figure 6:
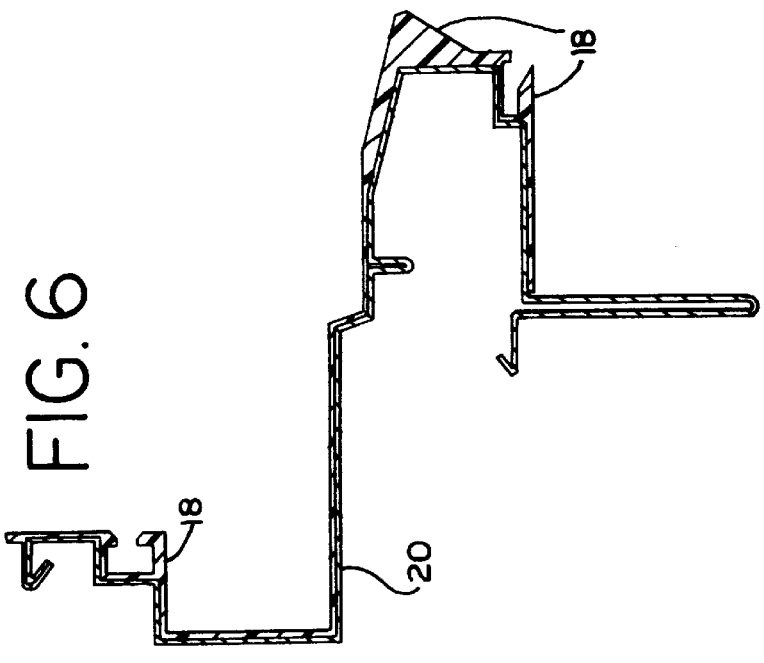
FIG. 6 is a cross-sectional view of the second sub-part after a thin layer of ETP has been extruded over it in predetermined functional shapes (shown along lines 6—6 of FIG. 4).
Figure 5:
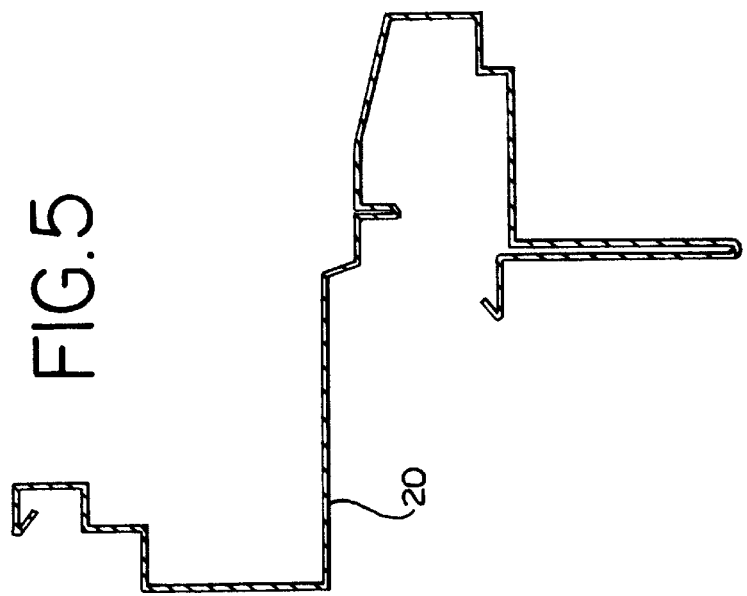
FIG. 5 is a cross-sectional view of the second sub-part after it has been roll-formed (shown along lines 5—5 of FIG. 1).

FIG. 4 is a diagram of a similar process for forming a second sub-part 20 that is the counterpart to the first sub-part 14 of FIG. 3. The second sub-part 20 is roll-formed to form the embodiment of FIG. 5, and then a profile of one-hundredth to six-hundredths of an inch thick layer of ETP 18 is extruded onto the second sub-part 20. It is preferred that some areas have thicker layers of ETP applied, as shown in FIG. 6, to improve the dent resistance of the window frame and/or sash.

With specific reference to FIG. 3, some of the ETP 18 is extruded onto the first sub-part 14 in a functional shape, such as the "C" shaped pockets 22a,b. The two sub-parts 14 and 20 are then joined together to form a length of structural component material 24, with the "C" shaped pockets 22a,b clipping the first sub-part 14 together with the second sub-part 20, as seen in FIG. 8. A second function of the "C" shaped pockets 22a,b is that they provide for both a thermal break and a noise break within the structural component material 24.

This process of extruding ETP shapes over roll-formed shapes extends the traditional roll-forming process with the capability of incorporating additional functional shapes onto or into the roll-formed component that either could not be done by roll-forming alone or would be cost prohibitive from a roll-form tooling standpoint. Material can be located on the interior or exterior of the roll-formed component to enhance performance and assembly requirements. It also extends traditional PVC extrusion process by allowing dark colors to be used without risk of heat deflection. The process has the further advantage of running between four to eight times faster than traditional extruded PVC components. This, combined with utilizing thin roll-forming and ETP materials, allows this process to produce components that are approximately the same manufacturing cost of traditional PVC extruded components, while incorporating superior mechanical properties.

After the roll-formed/extruded length of structural component material 24 leave the roll-coupling station 25 of FIG. 7, they are cut into lineal lengths, approximately sixteen to twenty feet, which are ready to be fabricated into window/structural components. For purposes of the window frame 26 shown in FIG. 10, the lineal lengths are miter-cut to form window frame components 28.

Figures 10, 11:
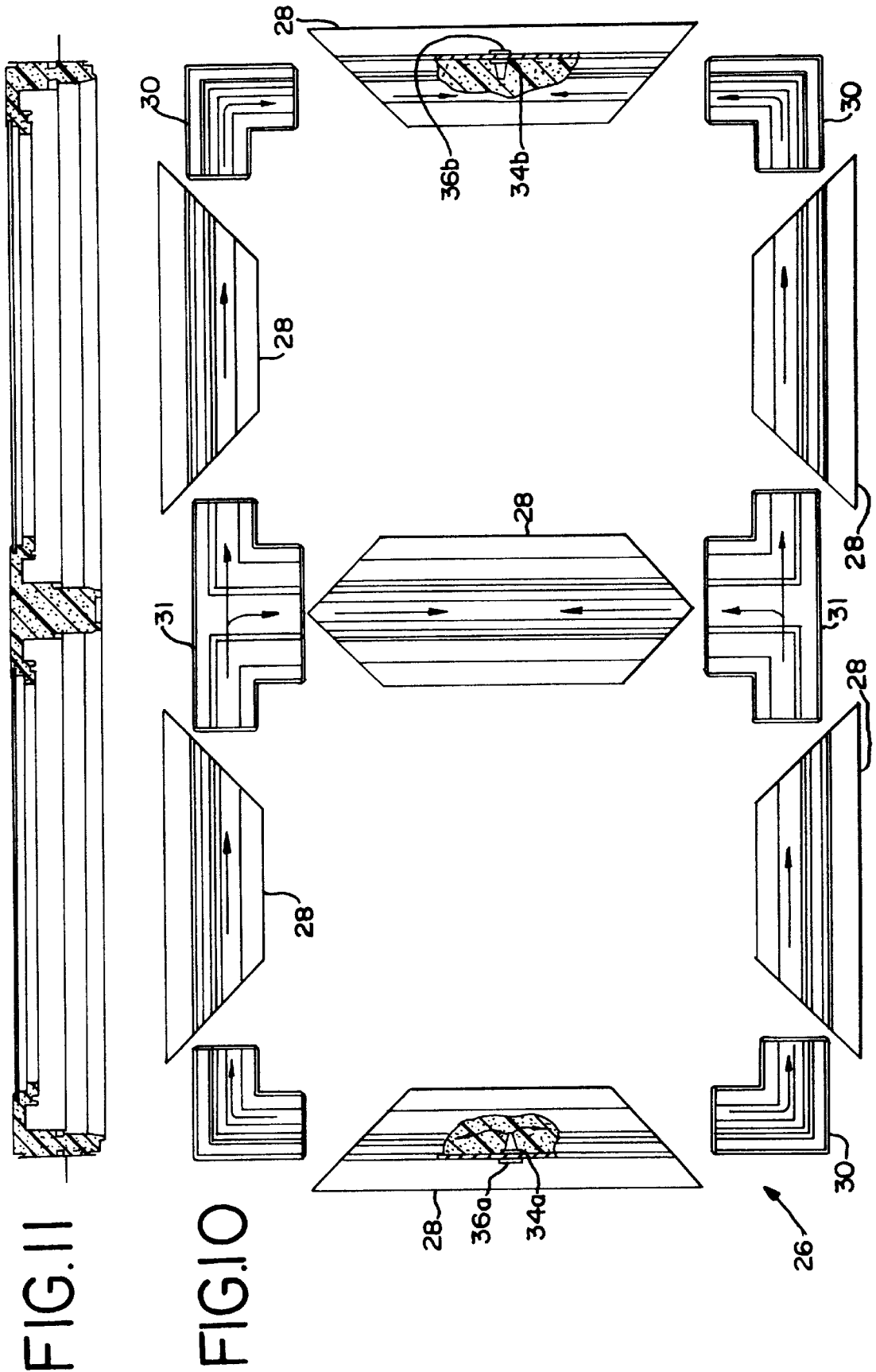
FIG. 10 is an exploded view of a two-sash casement with common frame and corner key assembly, with arrows depicting the flow path of the urethane foam fill as it is injected into the window casement assembly.
FIG. 11 is a top view of the two sash casement with common frame of FIG. 10.
Figure 12:
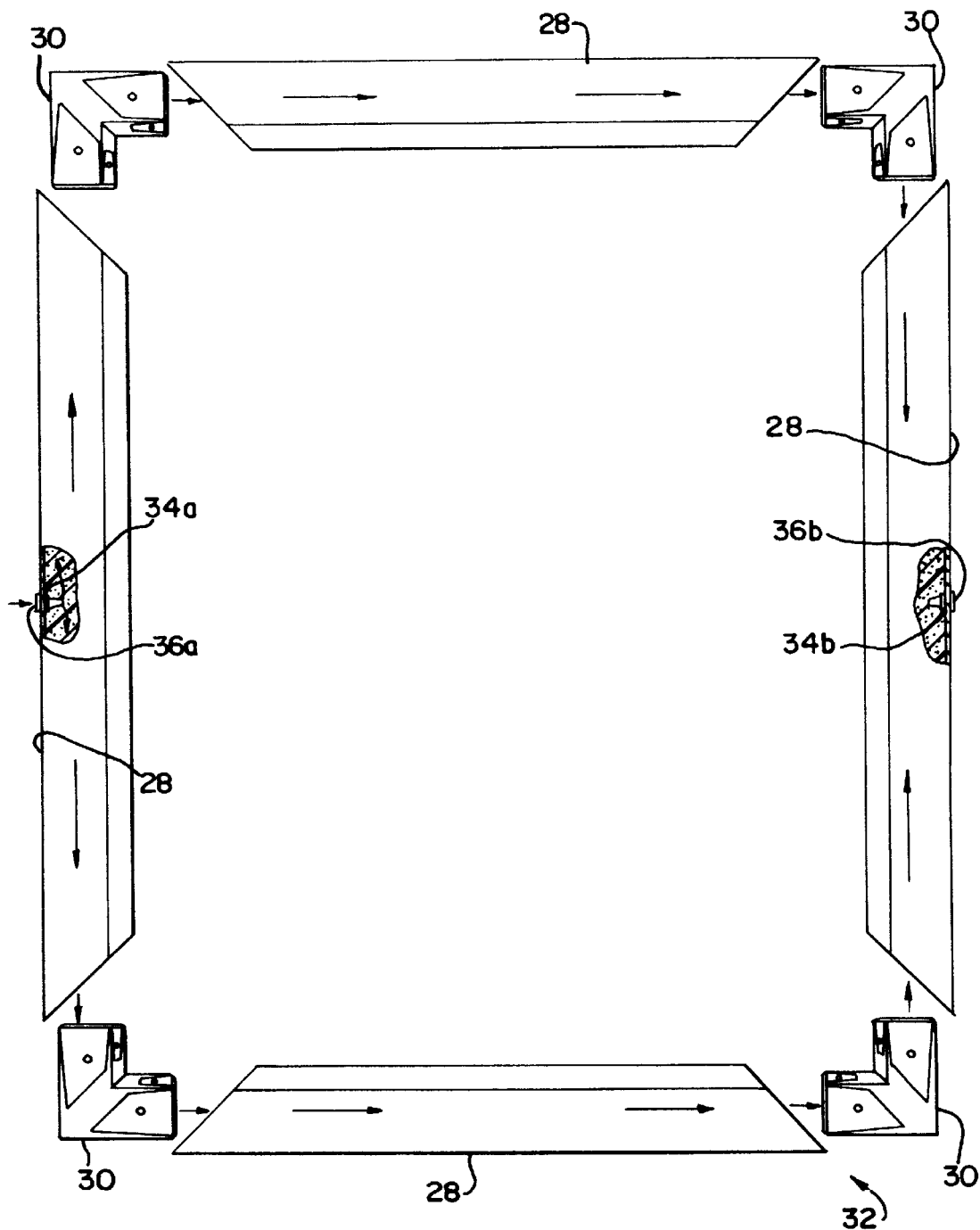
FIG. 12 is an exploded view of a sash and corner key assembly, with arrows depicting the flow path of the urethane foam fill as it is injected into the sash assembly.

FIG. 10 depicts a two-sash window frame 26 having a construction that utilizes four hollow injection-molded corner keys 30, the subject of the present invention. Although it is well-known in the art to provide window frame and sash components with various types of cuts, the preferred embodiment is illustrated as comprising miter-cut frame components 28 and four hollow injection-molded corner keys 30 that serve to join or couple the assembly together. In this particular embodiment, center corner keys 31 are also used. Once assembled, the parts can be temporarily held together via a small fastener (not shown) which passes through the frame components 28 into and through the wall of the corner key 30. As seen in FIGS. 10 and 12, small holes 34a,b (approximately ⅜ inch in diameter) are drilled mid-point on opposite sides of the window frame 26 (FIG. 10) and window sash 32 (FIG. 12), although it is known that the small holes 34a,b could be created anywhere along the exterior of the window frame 26 and sash 32. Two rubber grommet type devices 36a,b are inserted into holes 34a,b, respectively. The first grommet 36a is designed for a filling nozzle (not shown). A two-part urethane dispensing machine (also not shown), capable of injecting a precise shot of one to ten pounds of urethane foam 38 (via the filling nozzle which is inserted into the first grommet hole 36a) is used to fill the interior of the window frame 26 (FIG. 10) or sash 32 (FIG. 12). First grommet 36a also functions to keep the urethane foam 38 off of the finished outer surface of the window frame 26 and sash 32. The second grommet 36b acts as a vent plug to allow air to escape from hole 34b during the filling process, but retains the urethane foam 38 within the hollow window frame 26 (shown in partial view in FIG. 10) and sash 32 (shown in partial view in FIG. 12).

The preferred material for the urethane foam 38 is an expanded polyurethane-urea polymer comprising inter-reacting polymer isocyanate A, polyether polylol based on sucrose and glycerin initiators components B, polyester diol or polyol components C, chain-extending glycol components D, silicone surfactant component E, water component F and polyurethane catalysts. Each component is present in those relative proportions by weight, as known to one skilled in the art, to produce expanded rigid polyurethane foam with a density of four pounds per cubic foot. The water content F can be varied to also give densities ranging from 1.5 to 35.0 pounds per cubic foot. A chemical foam such as the one described is manufactured by Azon USA, Inc. under the product designation 13 302 A. A similar type foam, also produced by Azon USA, Inc., is sold under the product designation SUF 200 Series Component B.

The foam 38 is forced under pressure to flow through the entire assembly and expand to fill all of the internal voids of the window frame 26, as shown in FIG. 9. The hollow corner keys 30 are designed to allow the liquid foam 38 to pass through with minimal restriction.

Figure 13:
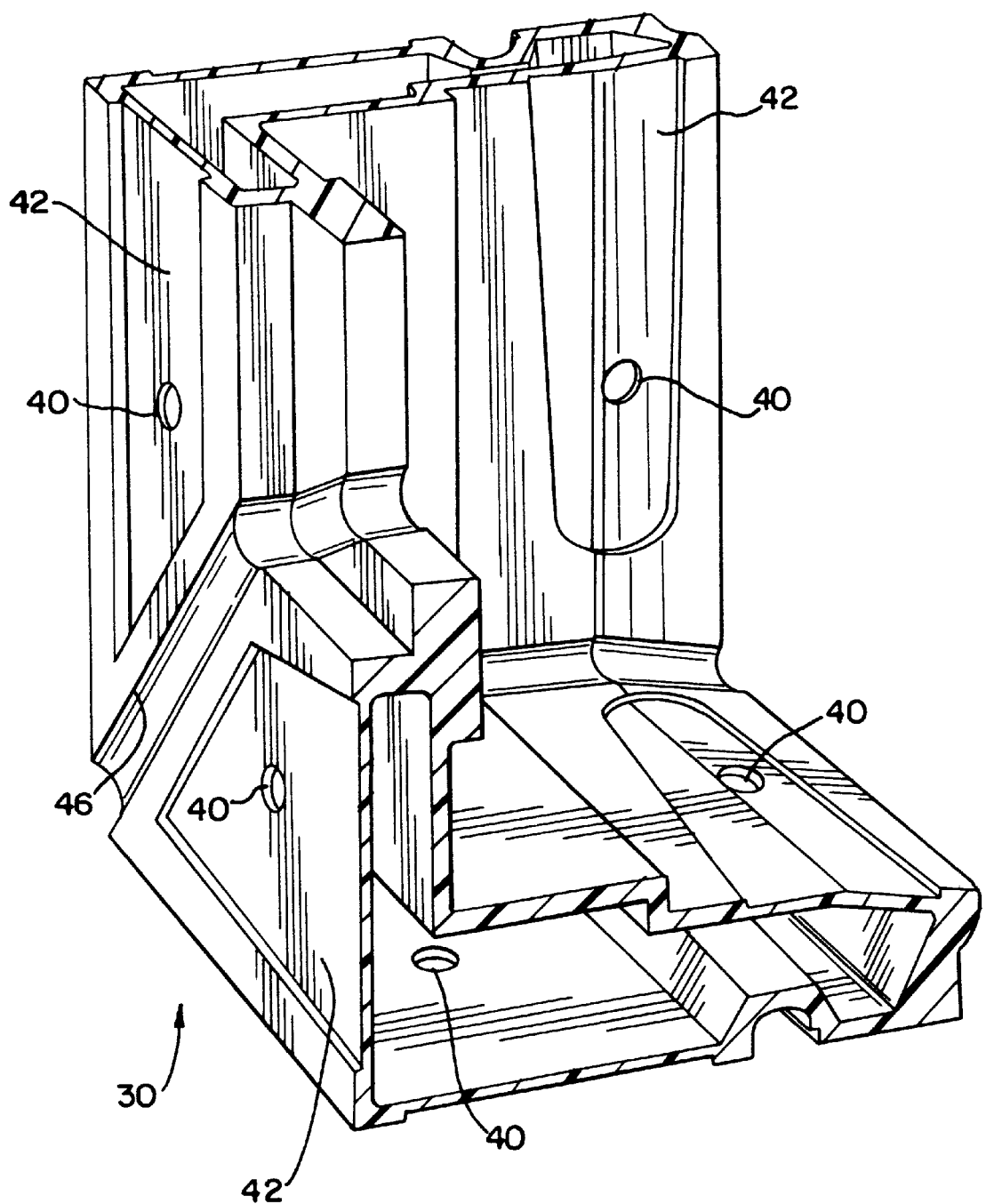
FIG. 13 is a perspective view of the hollow corner key of FIGS. 10 and 12.

Although the corner key 30 is designed so as to closely fit within the frame components 28, gaps ranging from five one-thousandths of an inch to ten one-thousandths of an inch still exist between the exterior of the corner key 30 and the interior of the frame component 28. These gaps, which extend along the miter joint area of the structural frame component 28, create voids that impede the flow of the urethane foam 38 around the miter joint. To overcome this impedance, as best shown in FIG. 13, the key 30 has strategic vent holes 40 molded into its outer walls to allow the foam 38 to flow around the outside of the corner key 30, which locks it to the window frame components 28. In addition, a series of recesses 42, which are integrated into the injection-molded corner key 30, allow the foam 38 to flow freely between the outside surfaces of the corner key 30 and the inside surfaces of the window frame components 28 while preventing the foam 38 from escaping through the miter joints of the window frame components 28 to the outside surfaces of the product. Further, a secondary groove 46 is molded into the corner keys 30 at the miter joint area to allow a caulk, or any similar type adhesive, to be injected through a hole (not shown) at each corner of the window frame 26 and into the secondary groove 46 of the corner key 30. The addition of the caulk bridges the vinyl and aluminum/steel miter cut edges to increase corrosion resistance in coastal applications.

Once filled with the urethane foam 38, which should take approximately twenty seconds for a four-foot by four-foot frame, the window frame 26 must sit in a square and flat stable condition until the urethane foam 38 cures to a solid. This curing state varies between thirty seconds and thirty minutes, depending on the catalytic reaction built into the foam formulation. After curing is complete, the window frame 26 can be further processed like any other window frame component, i.e., the attachment of hardware as known to one of ordinary skill in the art. The window sash 32 is manufactured similarly to window frame 26.

The injection of urethane foam 38 into the frame 26 and sash 32 serves three distinct functions. First, its primary purpose is as a structural reinforcement. The expansion of the foam 38 throughout the hollow interior of the frame 26 provides increased resistance to deflection of the roll-formed aluminum/steel caused by strong wind or other similar environmental conditions. The compressive tensile strength of the foam 38 limits the amount of buckling of the frame walls of the frame components 28. Should deflection of the aluminum occur, the addition of the foam 38 allows for the aluminum to return back to its original position, without any damage to the structure of the frame 26.

Consequently, the structural integrity of the frame 26 is significantly improved by the urethane foam fill 38. The composite frame component 28 (without foam filling 38) would act as a thin-walled column or beam. Generally, the load capacity of such thin-walled sections is limited by a buckling mode of failure. Thin walled sections may buckle under axial, torsion, or bending load. The fundamental reason is that the thin walls provide little resistance to lateral deflection.

Buckling of an un-reinforced section would initiate at some small localized imperfection, such as a dent or scratch. Axial, torsion, or bending loads on the section would cause lateral deflection in the vicinity of the defect and subsequently lead to instability and buckling collapse of the section. Thus, failure may occur at loads well below the yield limit of the section. The foam fill 38 within the section greatly reduces the lateral deflections, even if relatively large defects are present.

Increased lateral rigidity due to the foam fill 38 greatly reduces the tendency for buckling failure and thereby the load capacity of the frame components 28 are substantially increased. In addition, the injected foam 38 may fill in gaps between parts such as might occur to slight mismatch or misalignment of mating surfaces. As a result, load transfer between mating parts is more evenly distributed across the cross section of the frame 26. Uniform loading reduces the tendency for buckling failure and thus increase the load capacity of the frame components 28.

Secondly, the foam 38 acts as a sealant. As the foam 38 cures, it adheres the various pieces 28 and 30 of the frame 26 together, thereby locking them in position.

Finally, the foam 38 also acts as insulation against the thermal transfer of heat through the frame components 28. In addition, a combination of the two sub-parts 14 and 20 joined to form the structural component 24 having both a thermal and noise break, plus the layer of ETP 18 extruded on both the inside and outside surfaces of the two sub-parts 14 and 20, plus the addition of the urethane foam 38 within the resultant frame components 28, provides an excellent sound barrier.

For all of these functions, it is desirable to completely fill the spaces in between the corner keys 30 and extruded composite frame components 28. As can be seen in FIG. 12, vent holes 40 in the corner keys 30 facilitate complete filling of the recessed regions 42 of the corner keys 30. A particular difficulty of filling the recesses 42, in the absence of vent holes 40, is that the flow diverges into the recesses 42 immediately following an expansion of the flow (and thus a pressure drop in the flow stream) from the main cavity of the corner keys 30 into the main cavity of the extruded frame components 28. This is followed by a one hundred eighty degree turn into a long narrow flow path into the recesses 42. The vent holes 40 are more favorably located in the narrower (higher pressure) section of flow stream. The holes diverge at ninety degrees from the main cavity of the corner keys 30 and then lead into the recesses 42 where the flow diverges in all directions to fill the adjacent regions. The vent holes 40 may be centrally located within the recesses 42 and thereby reduce the length of the flow path within the narrow recess 42. Thus, the vent holes 40 solve the above mentioned difficulties in filling the recessed areas 42 of the corner keys 30.

A principle advantage of filling the recessed area 42 of the corner keys 30 through the vent holes 40 is that it provides the ability to adjust the flow into the recesses 42 without changing the design of the recesses 42 themselves. The geometry of the recesses 42 may thus be designed for optimum functionality in terms of the adhesion and locking capability. The flow into the recesses 42 can be separately controlled by the design of the vent holes 40. Flow into the recesses 42 is influenced by changing any of the following: the number and location of the vent hole(s) 40, the size of the vent hole(s) 40, and the geometry of the vent holes 40 (e.g., round versus rectangular, radius edges versus sharp edges).

Various features of the invention have been particularly shown and described in connection with the illustrated embodiment of the invention. However, it must be understood that these particular arrangements merely illustrate, and that the invention is to be given its fullest interpretation within the terms of the appended claims.

What is claimed is:

1. A corner key particularly adapted for use in connecting adjacent mitered hollow frame members in a structural unit containing injected foam, said corner key including:

a hollow body member including a first leg and a second leg disposed substantially perpendicular to said first leg;

a flow channel communicating thru said body member from said first leg thru said second leg;

one or more recessed portions formed on the exterior surface of said body member adapted to contain urethane foam; and at least one vent passage disposed between said flow channel and said recessed portion to allow limited flow of the injected foam from said interior of said body member to said exterior recessed portion.

2. A corner key in accordance with claim 1 including a flow groove defined on the exterior surface of said hollow body member at the intersection of said first and second legs adapted to contain a sealant material to seal said corner key to the structural unit.

* * * * *